June 2, 1953  G. W. JOHNSON  2,640,209
EGG WASHING MACHINE
Filed Sept. 9, 1946  3 Sheets-Sheet 1
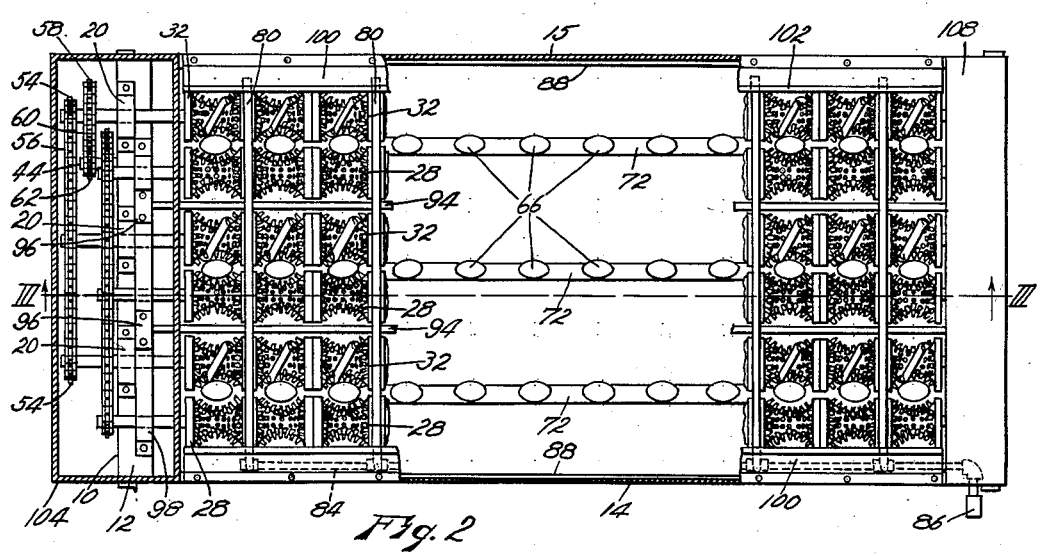
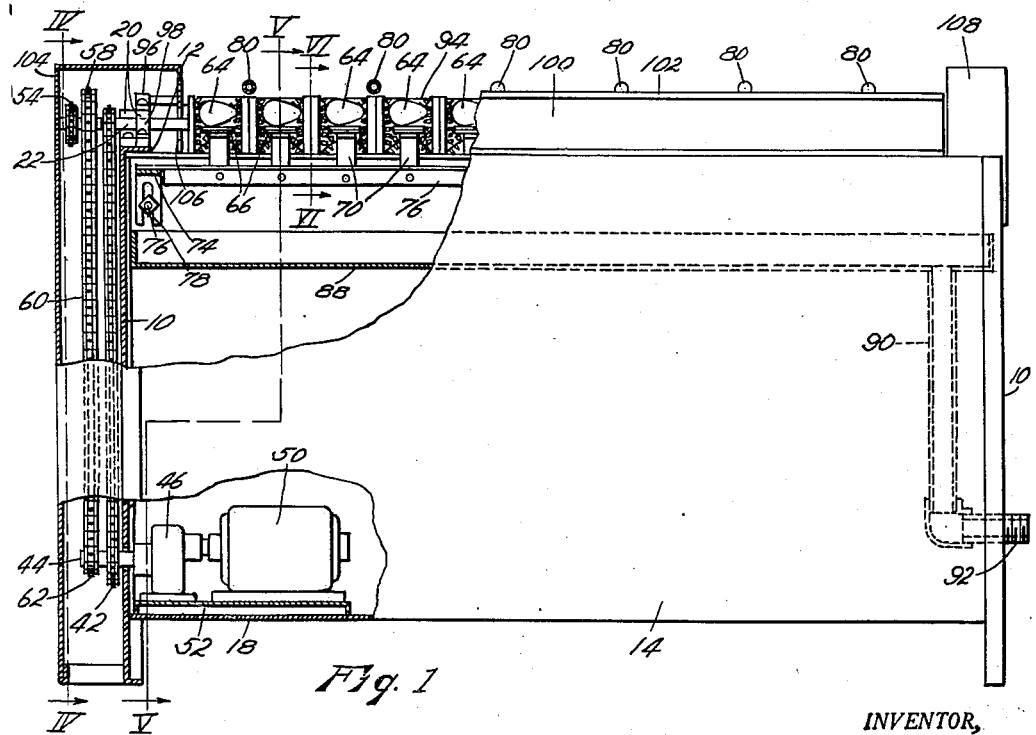
INVENTOR,
Gordon W. Johnson.
BY Roy E. Hamilton,
Attorney.

June 2, 1953  G. W. JOHNSON  2,640,209
EGG WASHING MACHINE
Filed Sept. 9, 1946  3 Sheets-Sheet 2

INVENTOR,
Gordon W. Johnson.
BY Roy E. Hamilton,
Attorney.

June 2, 1953　　　　　　G. W. JOHNSON　　　　　　2,640,209
EGG WASHING MACHINE

Filed Sept. 9, 1946　　　　　　　　　　　　　　3 Sheets-Sheet 3

INVENTOR,
Gordon W. Johnson.
BY
Roy E. Hamilton,
Attorney.

Patented June 2, 1953

2,640,209

UNITED STATES PATENT OFFICE 2,640,209

EGG WASHING MACHINE

Gordon W. Johnson, Raytown, Mo., assignor to Gordon Johnson Company, Kansas City, Mo., a corporation of Missouri Application September 9, 1946, Serial No. 695,702

9 Claims. (Cl. 15—3.12)

This invention relates to improvements in egg washing machines and has particular reference to egg washing machines of the rotary type.

The principal object of the present invention is the provision of a machine wherein each egg is positioned between a pair of rotating scrubbing spools.

A further object of the present invention is the provision of a means whereby said eggs are rotated with respect to said spools and at the same time caused to oscillate or wobble about their axes of rotation, thereby submitting every part of said egg to the scrubbing action of said spools.

Another object of the present invention is the reduction of egg breakage to a minimum.

Further objects of the present invention are simplicity and economy of construction, and ease and efficiency of operation.

With these objects in view, as well as other objects which will appear during the course of the specification, reference will be had to the drawings wherein:

Figure 1 is a front elevation of an egg washing machine embodying the present invention with a portion of the front panel, spool guard, and bearing cover box broken away to show details of operation.

Fig. 2 is a plan view partly broken away to show the details of construction.

Like numerals refer to similar parts throughout the several views.

Figure 3:
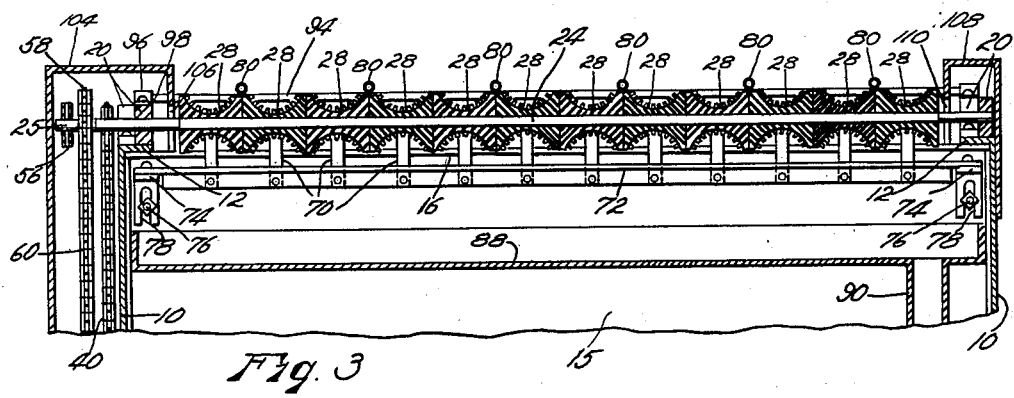
Fig. 3 is a fragmentary, vertical section taken on line III—III of Figure 2.
Figure 6:
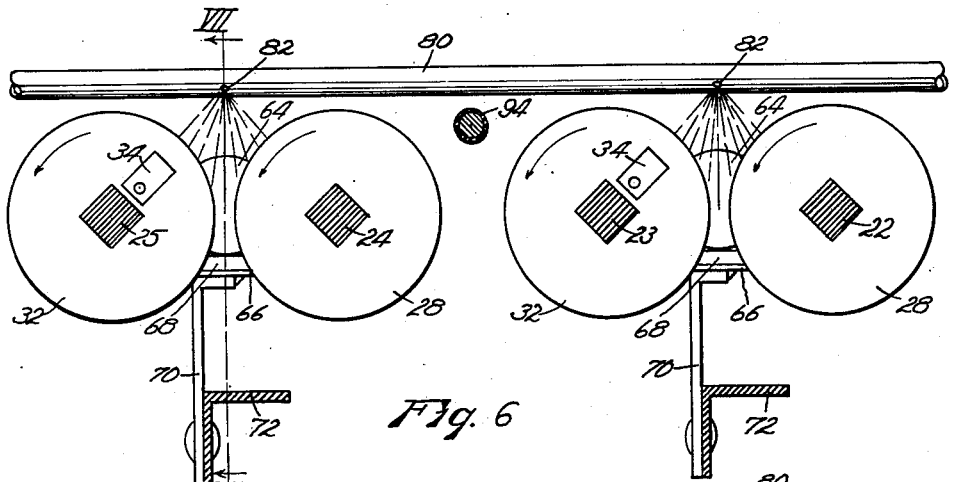
Fig. 6 is an enlarged vertical section taken on line VI—VI of Figure 1, showing two pairs of egg washing spools, with eggs carried in operative relationship thereto.
Figure 7:
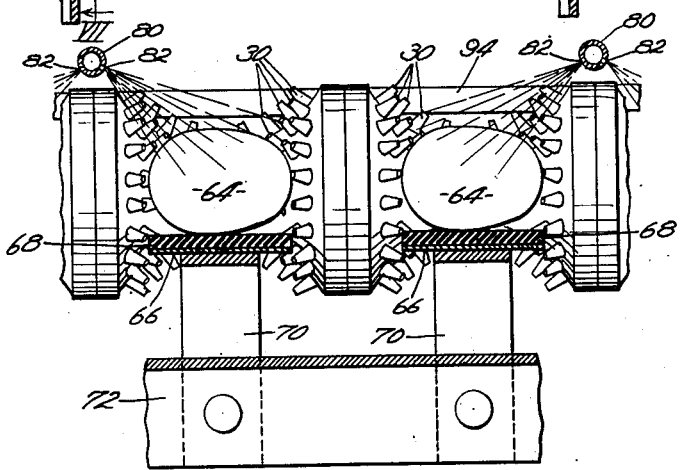
Fig. 7 is a vertical section taken on line VII—VII of Figure 6, showing a rear elevation of two egg scrubbing spools with eggs positioned in operative relationship thereto.
Figure 4:
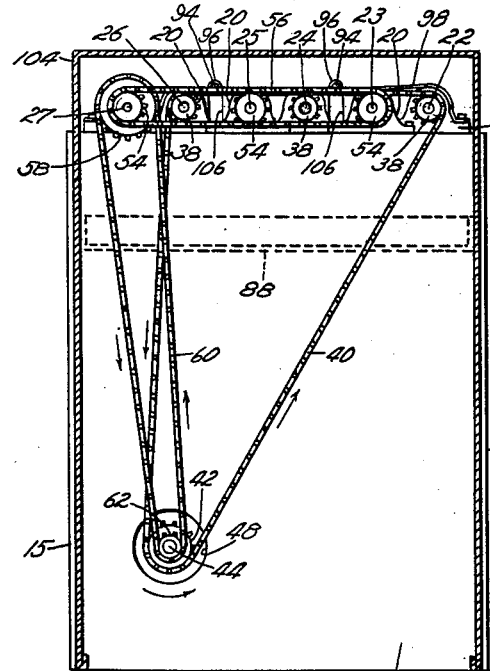
Fig. 4 is a vertical section taken on line IV—IV of Figure 1 showing the spool rotating means.
Figure 5:
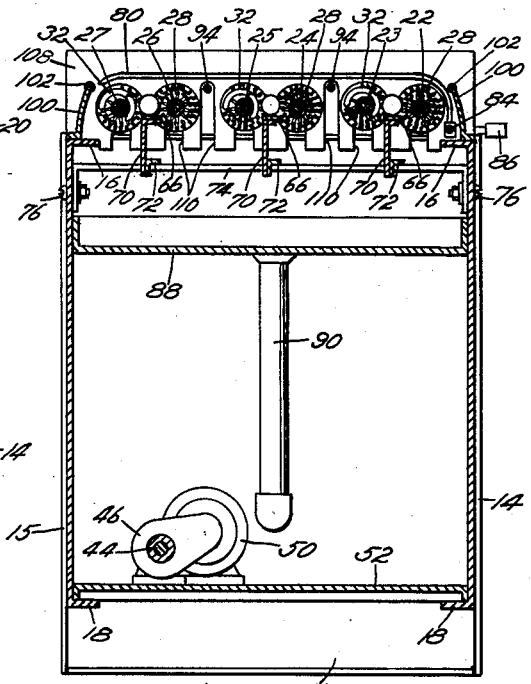
Fig. 5 is a vertical section taken on line V—V of Figure 1.

The frame of the egg washing machine consists of two end panels 10 equipped with inwardly projecting flanges 12 at the upper ends thereof, a front panel 14, and a rear panel 15, said front and rear panels being rigidly connected to said end panels, and being equipped with inwardly projecting flanges 16 at the upper edges thereof and with inwardly projecting flanges 18 at the lower edges thereof.

Firmly fixed to upper flanges 12 of said end panels are a plurality of bearings 20. Carried for rotation by said bearings are shafts 22, 23, 24, 25, 26 and 27, said shafts being positioned respectively from the front to the rear of the machine, being parallel and lying in a common horizontal plane. The portions of said shafts included between said bearings are of square cross section.

Shafts 22, 24 and 26 carry a plurality of egg scrubbing spools 28, said spools being secured against rotation on said shafts. Said scrubbing spools are made of rubber or other resilient material, and have a shape similar to the solid generated by the revolution of the arc of a circle about an axis co-planar with said arc and lying outside of said arc, said axis being at right angles with the extended bisecting radius of said arc. The concave surfaces of said spools are equipped with a plurality of integral resilient fingers 30 projecting outwardly from said spool normally to said concave surfaces.

Shafts 23, 25 and 27 carry a plurality of egg turning spools 32, said turning spools being secured against rotation on said shafts and so positioned with respect to said scrubbing spools so as to furnish a plurality of rows of alternating egg scrubbing and egg turning spools from the front to the rear of the machine, as shown in Figure 2.

Figure 8:
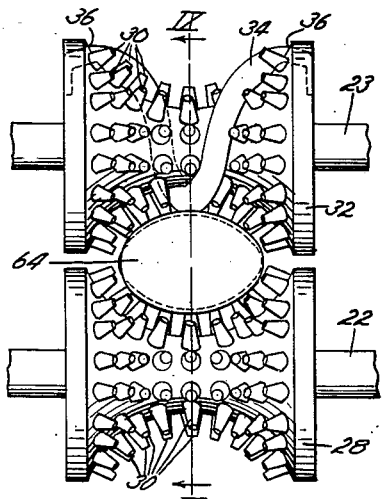
Fig. 8 is a plan view of an egg scrubbing spool and an egg turning spool in cooperating relationship with an egg operatively positioned therebetween.
Figure 9:
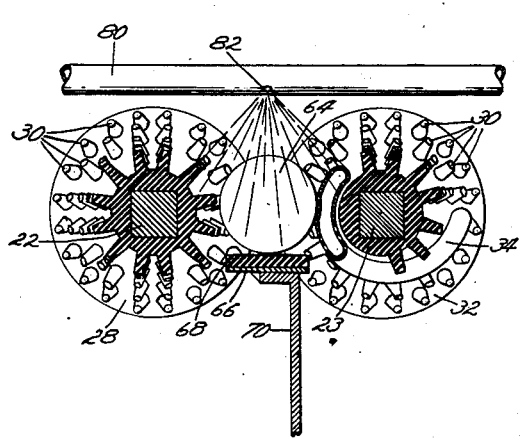
Fig. 9 is a vertical section taken on line IX—IX of Figure 8.

Said egg turning spools are identical to egg scrubbing spools 28, except that a tube 34 of gum rubber, or similar material, is spirally wrapped around each of said egg turning spools, as shown in Figure 8. The ends of said tube extend through holes 36 in the end flanges of said spools and are firmly fixed to the end surfaces thereof. A portion of the fingers 30 are removed from said spools to allow said tube to rest firmly against the concave surfaces of said spools. Said tube is of sufficient thickness to extend outwardly from said spool surfaces slightly farther than fingers 30.

To the ends of shafts 22, 24 and 26 extending outwardly beyond end panel 10, are rigidly connected sprockets 38 operatively connected by means of chain 40 to sprocket 42, which is rigidly connected to shaft 44 of gear reducer 46, said shaft extending through hole 48 in said end panel 10. Said gear reducer is operatively connected to motor 50, both the gear reducer and said motor being carried by motor mount 52. Said motor mount is rigidly fixed to lower flanges 18 of front panel 14 and rear panel 15.

To the ends of shaft 23, 25 and 27, extending outwardly beyond the extended ends of shafts 22, 24 and 26, are rigidly connected sprockets 54, said sprockets being operatively connected by means of chain 56. A sprocket 58, rigidly attached to the extended end of shaft 27 is operatively connected by means of chain 60 to sprocket 62 rigidly mounted on shaft 44 of gear reducer 46.

Analysis of the above described chain and sprocket system reveals that the scrubbing spools 28 carried on shafts 22, 24 and 26 will be rotated in the same direction as the egg turning spools 32 carried on shafts 23, 25 and 27, but at a greater speed.

Each egg scrubbing spool 28, in combination with the egg turning spool 32 directly to the rear of it, forms a means for washing a single egg, said egg, designated by the figure 64, being supported between said spools on a substantially elliptical egg stand 66, said stand having a covering 68 of soft rubber or similar material, and being rigidly fastened to a downwardly extending bracket 70. All of said brackets for supporting said egg stands between spools carried on two successive shafts are rigidly connected at their lower ends to a support member 72 extending from side to side of the machine parallel with said shafts. The ends of said support members are rigidly attached to support members 74 extending horizontally between front panel 14 and rear panel 15 and adjustably fixed to said front and rear panels by means of bolts 76, which pass through slots 78 in the downwardly turned ends of support members 74 and through said front and rear panels. By means of this adjustment, egg stands 66 may be positioned higher or lower with respect to the washing spools, thereby accommodating the machine to receive eggs of different sizes.

Spray tubes 80 extend from the front to the rear of the machine over alternate juncture points of the egg scrubbing and egg turning spools, as shown in Figure 2, and have holes 82 drilled at spaced intervals therein adapted to direct downwardly divergent sprays of water against eggs 64, continuously washing them.

The forward ends of said spray tubes are connected to common water supply pipe 84, the extended end of which is fitted with a hose connection 86. A drain pan 88 positioned below said egg scrubbing and turning spools and rigidly fastened to end panels 10, front panel 14 and rear panel 15 catches the water from said spray tubes after it has passed over the eggs being washed. A downwardly extending drain pipe 90 attached to said drain pan at its upper end and having an angled extension 92 at its lower end extending through end panel 10, carried water from said drain pan to a suitable drain.

Rubber covered rods 94 parallel to shafts 22 to 27 and extending the length of said shafts at positions immediately above the spaces between the spools carried on shafts 23 and 24 and above the spaces between the spools carried on shafts 25 and 26, are rigidly attached by brackets 96 to support members 98 rigidly attached to bearings 20. Said rubber covered rods serve to prevent the accidental insertion of eggs into spaces where there are no egg stands to receive them.

Spool guards 100 rigidly attached to upper flanges 16 of front panel 14 and rear panel 15 and extending upwardly and inwardly, protect the spools carried on shafts 22 and 27. The upper edges of said spool guards are equipped with edges 102 of rubber or other resilient material which serve to prevent accidental breakage of eggs.

A cover box 104 carried by end panel 10 and having slots 106 for passing over spool carrying shafts 22 to 27 and over rubber covered rods 94, covers bearings 20 and the sprocket and chain spool driving system described above. The bearings 20 supporting the opposite ends of spool carrying shafts 22 to 27 are covered by a cover box 108, supported by end panel 10 and having slots 110 for passing over said shafts and said rubber covered rods.

After motor 50 has been started, thus turning egg scrubbing spools 28 and egg turning spools 32, and water has been supplied under pressure to spray tubes 80, an operator standing in front of the machine manually places each egg 64 individually on an egg stand 66 which supports said egg between said egg scrubbing and egg turning spools. Since the portion of said egg scrubbing spool adjacent to said egg stand is moving downwardly with respect to said egg stand, and since the portion of said egg turning spool adjacent to said egg stand is moving upwardly with respect to said egg stand, said egg will be continuously rotated. At the same time, since the downwardly moving egg scrubbing spool moves more rapidly than said upwardly moving egg turning spool, said egg will be urged downwardly against said egg stand as it rotates.

The above mentioned differing speeds of the egg scrubbing and egg turning spools with respect to said egg also insure that there will be a scrubbing movement between said spools and said egg and not merely a rolling contact. Since spiral tubes 34 of the egg turning spool 32 project outwardly from said spools beyond the ends of fingers 26, it will be in constant contact with said egg. Since the point of contact between said spiral tube and said egg rhythmically moves from one end of said egg to the other as the egg turning spool rotates, said egg will be caused to oscillate or wobble about its axis of rotation. Said oscillation or wobbling insures that all parts of said egg, including its ends, will be subjected to the scrubbing action of fingers 26. An operator standing at the rear of the machine removes each egg after it has been cleaned by manually pushing said egg against egg turning spool 32 with a slight pressure. This moves said egg out of contact with egg scrubbing spool 28, thereby allowing the upward movement of said egg turning spool to lift said egg upwardly into the hand of said operator.

A feature of this invention is that each egg is washed individually and in full view of the operator of the machine. Each egg may therefore be removed as soon as the operator sees that it is clean, thereby effecting a considerable saving of time.

Another feature of this invention is that the eggs at no time contact any hard or metallic object, but only soft rubber or other resilient material, thus reducing egg breakage to a minimum.

What I claim as new and desire to protect by Letters Patent is:

1. In an egg washing machine of the character described, the combination with an egg scrubbing spool having a concave outer face to which is fixed a plurality of outwardly extending resilient fingers, of an egg turning spool similar to said egg scrubbing spool but with the addition of a helical rib of resilient material attached to said egg turning spool and extending outwardly from said concave surface slightly farther than said fingers, means for rotating said spools about substantially parallel axes, and means for supporting an egg between and in contact with said spools.

2. An egg washing machine comprising a frame, a plurality of pairs of cooperating spools rotatably carried by said frame, each of said spools having a concave outer face to which are fixed a plurality of outwardly extending resilient scrubbing fingers, one spool of each pair having a substantially helical rib of a resilient material attached thereto extending around said concave spool surface and extending outwardly from said surface slightly farther than said fingers, each of said pairs of spools being adapted to receive an egg therebetween; means for supporting an egg between and in contact with each of said pairs of spools; means for rotating the spools of each said pairs about substantially parallel axes and in the same direction, the spool having said helical rib moving upwardly with respect to said egg supporting means, and the other spool moving downwardly with respect to said egg supporting means but at a greater speed than the spool having said helical rib; and means for directing a spray of washing fluid over said eggs as they are supported between said pairs of spools.

3. In an egg washing machine of the character described, a pair of concave spools carried for rotation about parallel axes, means for rotating said spools at different speeds, means for supporting an egg between said spools in contact with both spools, and an elongated resilient member fixed at its ends to opposite ends of one of said spools and wrapped loosely about the concave surface of said spool in a substantially helical form.

4. In an egg washing machine of the character described, a pair of concave spools carried for rotation about parallel axes, means for rotating said spools at different speeds, means for supporting an egg between said spools in contact with both spools, a plurality of resilient fingers extending outwardly from the concave surfaces of said spools to contact said egg, and an elongated flexible member fixed at its ends to one of said spools and wrapped loosely about the concave surface of said spool in substantially helical form, said member normally projecting outwardly from the surface of said spool slightly farther than said fingers.

5. In an egg washing machine of the character described, a pair of concave spools carried for rotation about parallel axes, means for rotating said spools at different speeds, means for supporting an egg between said spools in contact with both spools, and an elongated resilient member of hollow tubular form fixed at its ends to opposite ends of one of said spools and wrapped loosely about the concave surface of said spool in substantially helical form.

6. In an egg washing machine of the character described, the combination with an egg scrubbing spool having a concave outer face to which are fixed a plurality of outwardly extending resilient fingers, of an egg turning spool similar to said egg scrubbing spool but with the addition of a helical rib of resilient material attached to said egg turning spool and extending outwardly from said concave surface slightly farther than said fingers, means for supporting an egg between and in contact with said spools, and means for rotating said spools in the same direction on substantially parallel, horizontal axes, whereby to continuously rotate said egg.

7. In an egg washing machine of the character described, the combination with a pair of spools each having a concave outer face to which are fixed a plurality of outwardly extending resilient fingers, means for supporting an egg between and in contact with the fingers of said spools, and means for rotating said spools about spaced, substantially parallel, horizontal axes in the same direction and at differing speeds, the speed of rotation of the spool whose fingers move downwardly against the egg being greater than the speed of rotation of the spool whose fingers move upwardly against the egg, whereby said egg is rotated and constantly urged downwardly against said supporting means.

8. In an egg washing machine of the character described, the combination with an egg scrubbing spool having a concave outer face to which are fixed a plurality of outwardly extending resilient fingers, of an egg turning spool similar to said egg scrubbing spool but with the addition of a helical rib of resilient material attached to said egg turning spool and extending outwardly from said concave surface slightly farther than said fingers, means for supporting an egg between and in contact with said spools, and means for rotating said spools about spaced, substantially parallel, horizontal axes in the same direction and at differing speeds, the speed of rotation of the spool whose fingers move downwardly against the egg being greater than the speed of rotation of the spool whose fingers move upwardly against the egg, whereby the egg is constantly rotated and constantly urged downwardly against said supporting means.

9. In an egg washing machine of the character described, the combination with an egg scrubbing spool having a concave outer face of an egg turning spool similar to said egg scrubbing spool but with the addition of a helical rib attached to said egg turning spool and extending outwardly from the concave surface thereof, means for rotating said spools on substantially parallel, horizontal axes, and means for supporting an egg between and in contact with said spools and in contact with the rib of said egg turning spool.

GORDON W. JOHNSON.

References Cited in the file of this patent

UNITED STATES PATENTS

| Number | Name | Date |
|---|---|---|
| 1,113,190 | Brandt | Oct. 13, 1914 |
| 1,124,487 | Maull | Jan. 12, 1915 |
| 1,513,195 | Stevens | Oct. 28, 1924 |
| 1,566,611 | Lister | Dec. 22, 1925 |
| 1,920,064 | Cogsdill | July 25, 1933 |
| 2,012,655 | Bowman | Aug. 27, 1935 |
| 2,195,303 | Haskins | Mar. 26, 1940 |
| 2,286,393 | Thomas | June 16, 1942 |
| 2,412,565 | Davis | Dec. 17, 1946 |

FOREIGN PATENTS

| Number | Country | Date |
|---|---|---|
| 416,643 | Great Britain | Sept. 18, 1934 |